United States Patent
Han et al.

(10) Patent No.: US 8,203,639 B2
(45) Date of Patent: Jun. 19, 2012

(54) METHOD FOR RESETTING TIME-BASED CMOS IMAGE SENSOR

(75) Inventors: Gunhee Han, Goyang-si (KR); Dongmyung Lee, Seoul (KR); Kunhee Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 830 days.

(21) Appl. No.: 12/314,215

(22) Filed: Dec. 5, 2008

(65) Prior Publication Data

US 2009/0153714 A1    Jun. 18, 2009

(30) Foreign Application Priority Data

Dec. 13, 2007 (KR) ........................ 10-2007-0129809

(51) Int. Cl.
*H04N 5/335* (2006.01)
(52) U.S. Cl. ........................ 348/308; 348/297
(58) Field of Classification Search .............. 348/308, 348/294, 297; 250/208.1; 257/290–292
See application file for complete search history.

(56) References Cited

U.S. PATENT DOCUMENTS

| | | | | |
|---|---|---|---|---|
| 7,485,836 B2* | 2/2009 | Altice et al. | ............... | 250/208.1 |
| 7,719,590 B2* | 5/2010 | Ellis-Monaghan et al. | .. | 348/308 |
| 7,973,841 B2* | 7/2011 | Neukom | ...................... | 348/294 |

FOREIGN PATENT DOCUMENTS

KR    10-2008-0035947    4/2008

OTHER PUBLICATIONS

Jihyun Cho et al., "A Time Based Active Pixel Sensor for Low Voltage CIS," in Proc. Int. SoC Design Conf., Seoul, Korea, Oct. 2006, pp. 109-112.
Kunhee Cho et al., "Low Voltage Time Based CMOS Active Pixel Sensor," in IEEE Int. SoC Design Conf., Busan, Korea, Nov. 2008, pp. 97-100.
Kunhee Cho et al., "A 0.75V CMOS Image Sensor Using Time-Based Readout Circuit," in Proc. IEEE Symp. On VLSI Circuits, Kyoto, Japan, Jun. 2009, pp. 178-179.

* cited by examiner

*Primary Examiner* — Mohammed Hasan
(74) *Attorney, Agent, or Firm* — Harness, Dickey & Pierce, P.L.C.

(57) ABSTRACT

A method of resetting a time-based CMOS image sensor may be provided, where the time-based CMOS image sensor may include a photodiode, a transfer transistor transferring photo-generated charges generated in the photodiode to a floating diffusion node and having a gate to which a ramp signal is input, and a reset transistor resetting the photodiode and the floating diffusion node. The method may include generating photo-generated charges at the photodiode, transferring the photo-generated charges to the floating diffusion node in response to a ramp signal; and resetting a reset electron potential of the photodiode to be higher than a reset electron potential of the floating diffusion node.

17 Claims, 7 Drawing Sheets

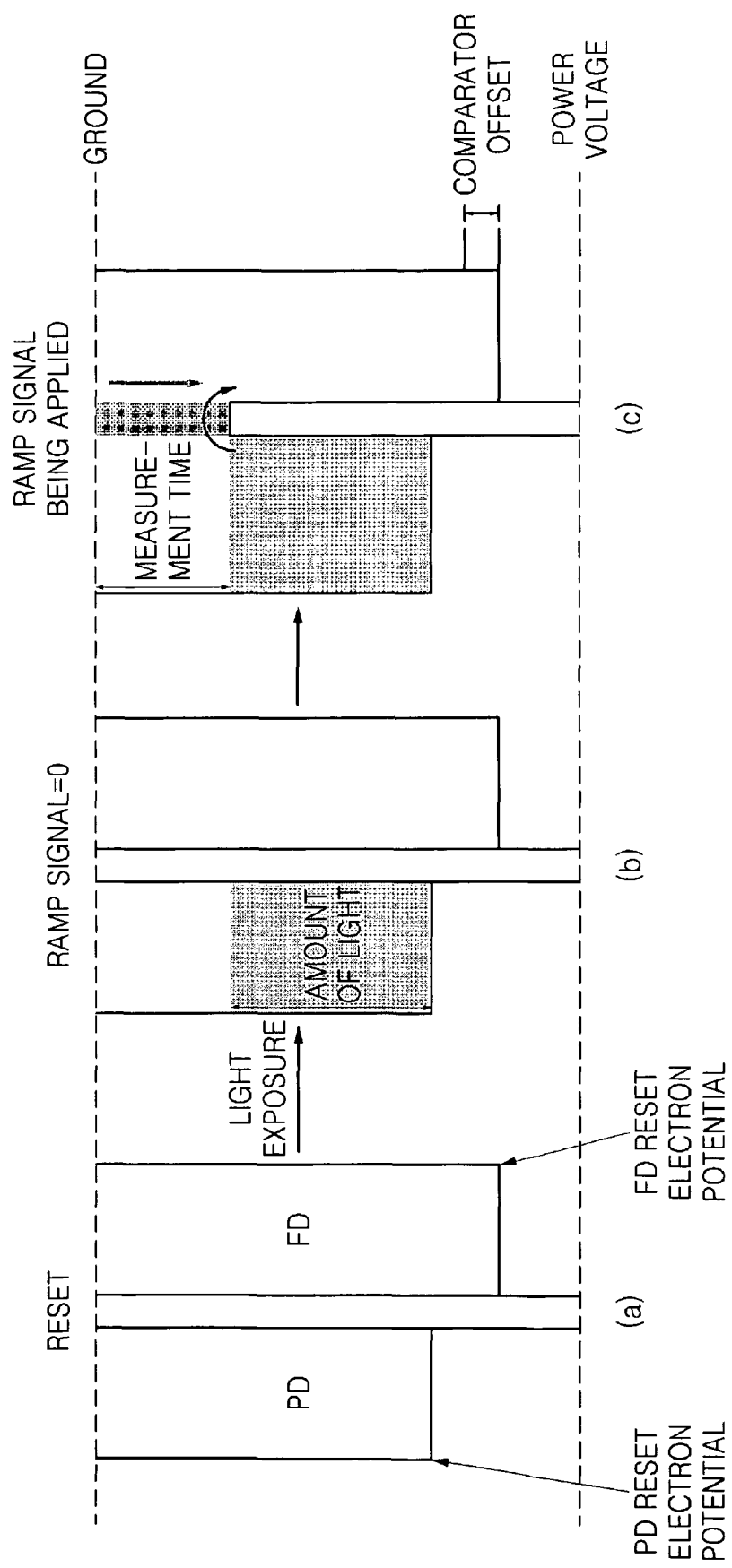

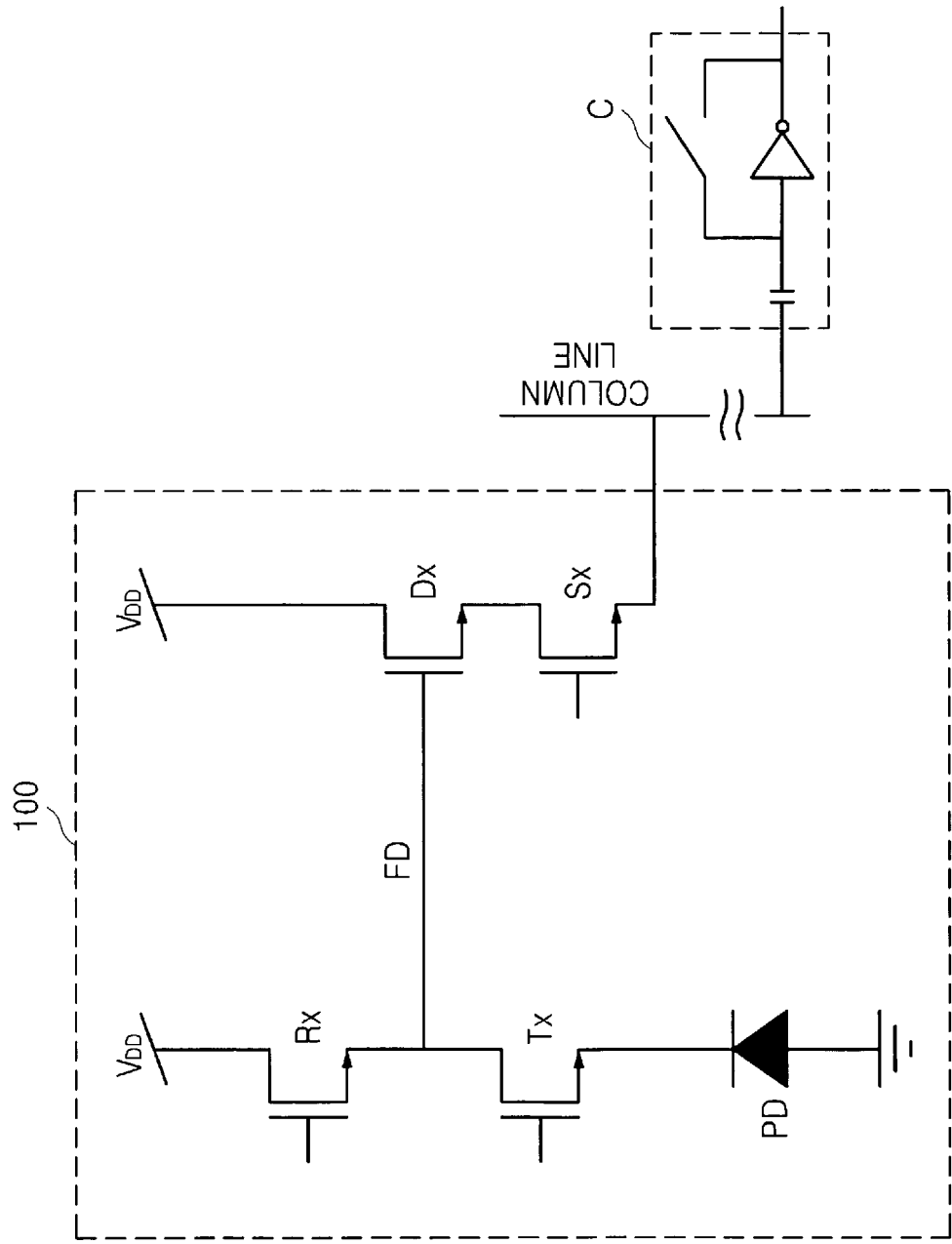

METHOD FOR RESETTING TIME-BASED CMOS IMAGE SENSOR

PRIORITY STATEMENT

This application claims priority under 35 U.S.C. §119 to Korean Patent Application No. 10-2007-0129809, filed on Dec. 13, 2007, in the Korean Intellectual Property Office, the entire contents of which is incorporated herein by reference

BACKGROUND

1. Technical Field

Example embodiments relate to a method for resetting and driving a time-based CMOS image sensor, for example, to a method for resetting and driving a time-based CMOS image sensor which may be operated at a low illumination by detecting a fine amount of light, where an intensity of the light may be low, by allowing a reset electron potential of a photodiode to be higher than that of a floating diffusion node by at least an offset of a comparator during resetting of the photodiode and the floating diffusion node.

2. Description of Related Art

In general, image sensors capture images using a characteristic of a semiconductor that responds to light. Objects existing in nature may have different brightness and wavelengths with respect to light and thus show a different electrical value at each pixel of a detector. The image sensor may convert the electrical value to a level that may be signal processed. Image sensors may be widely used, for example, in a video conference camera, a digital still camera, a PC camera, and more generally, a personal portable communication apparatus having a function to transfer image information.

The image sensor includes a charge coupled device (CCD) image sensor and a complementary metal oxide semiconductor (CMOS) image sensor. The CMOS image sensor may be increasingly used compared to the CCD image sensor because a driving method is simple, embodiments in a variety of scanning methods are possible, a single processing circuit may be integrated in a single chip so that a compact product may be manufactured, a CMOS manufacturing technology is used so that a manufacturing cost may be reduced, and power consumption is low.

However, in the CMOS image sensor, a power voltage may not be lower than a particular voltage due to a limit in light signal input of a photodiode. Also, although a pixel size is generally decreased as desired image quality increases, the pixel size cannot be decreased below a particular size due to a fill factor of the pixel.

To address these problems, a time-based CMOS image sensor capable of operating at a low voltage power has been developed. The time-based CMOS image sensor may measure the amplitude of a signal in terms of time by applying a ramp signal in a pixel.

FIG. 1A is a circuit diagram of a conventional time-based CMOS image sensor. FIG. 1B is an electron potential diagram during resetting and operation of the conventional time-based CMOS image sensor.

Referring to FIG. 1A, a unit pixel 10 of the conventional time-based CMOS image sensor includes a reset transistor Rx, a transfer transistor Tx, a photodiode PD, a floating diffusion node FD, a source follower transistor Dx, and a pixel selection transistor Sx. Although not illustrated, a comparator may be electrically connected to a source of the pixel selection transistor Sx.

In FIG. 1A, in a general time-based CMOS image sensor, the photodiode PD and the floating diffusion node FD are reset to the same reset voltage $V_{DD}-V_T$ by the reset transistor Rx. Where, $V_{DD}$ is a power voltage and $V_T$ is a threshold voltage of the transfer transistor TX or the reset transistor RX. Thus, referring to FIG. 1B, the reset electron potential of the floating diffusion node FD is the same as that of the photodiode PD. Even when a ramp signal is applied to the transfer transistor Tx after exposure, the time-based CMOS image sensor is not operable if the reset electron potential or voltage of the photodiode PD is lower than the reset electron potential of the floating diffusion node FD raised by a comparator offset. The comparator offset signifies the minimum voltage that may be detected by the comparator. Thus, the conventional time-based CMOS image sensor is not operable at a low illumination because the difference in the reset electron potential from the photodiode PD to the floating diffusion node FD is not large enough to overcome the comparator offset. As a result, a digital correlated double sampling (CDS) method may not be applied to the time-based CMOS image sensor so that the time-based CMOS image sensor may be very sensitive to noise.

SUMMARY

Example embodiments may provide a method for resetting a time-based CMOS image sensor which may be operated at a low illumination by detecting the amount of light even when a fine light signal is input.

According to example embodiments, a method of resetting a time-based CMOS image sensor may be provided, where the time-based CMOS image sensor may include a photodiode, a transfer transistor transferring photo-generated charges generated in the photodiode to a floating diffusion node and having a gate to which a ramp signal is input, and a reset transistor resetting the photodiode and the floating diffusion node. The method may include generating photo-generated charges at the photodiode, transferring the photo-generated charges to the floating diffusion node in response to a ramp signal; and resetting a reset electron potential of the photodiode to be higher than a reset electron potential of the floating diffusion node.

The resetting may apply a voltage to the transferring that is smaller than a voltage applied to the resetting.

The resetting may include resetting the electron potential of the photodiode to $V_{DD}-\Delta-V_T$, where the $V_{DD}$ is a power voltage and the $V_T$ is a threshold voltage of the transfer transistor or the reset transistor and $\Delta>0$, turning the transfer transistor off after the voltage of the photodiode is reset to $V_{DD}-\Delta-V_T$, and resetting a voltage of the floating diffusion node to $V_{DD}-V_T$.

Example embodiments may further include turning on a pixel selection transistor and a switch of a comparator to sample the voltage of the floating diffusion node and an offset voltage of the comparator, where a gate of a drive transistor is connected to the floating diffusion node, a drain of the pixel selection transistor is connected to a source of the drive transistor, and the comparator is connected to a source of the pixel selection transistor.

A threshold voltage difference between the reset transistor and the transfer transistor is greater than or equal to the comparator offset voltage, where the comparator offset voltage is a minimum voltage that is detected by the comparator.

Example embodiments may further include turning off the reset transistor and the transfer transistor after the resetting to concentrate the photo-generated charges in the photodiode, and applying a ramp signal to a gate of the transfer transistor to transfer the photo-generated charges concentrated in the photodiode to the floating diffusion node.

Example embodiments may further include measuring a section of time of in which a voltage of the photodiode is maintained constant during which the ramp signal is applied in the applying of the ramp signal to the gate of the transfer transistor.

The measuring the section of time may include determining a measurement time, $T_{sig}$, by the equation, $T_{sig}=(V_{DD}-\Delta-\Delta_{sig})/S_{ramp}$, where $V_{DD}$ is a power voltage, $\Delta$ is at least one of a comparator offset voltage and electron potential difference between the floating diffusion node FD and the photodiode, $\Delta_{sig}$ is an amount of the photo-generated charges, and $S_{ramp}$ is an inclination of the ramp signal.

Example embodiments may further include applying digital correlated double sampling (CDS) to remove at least one of a threshold voltage of the transfer resistor and the comparator offset voltage.

BRIEF DESCRIPTION OF THE DRAWINGS

The above and other features and advantages will become more apparent by describing in detail example embodiments thereof with reference to the attached drawings in which:

FIG. 2 is a reset electron potential diagram according to example embodiments;

FIG. 3 is a circuit diagram of a time-based CMOS image sensor according to example embodiments;

DETAILED DESCRIPTION

Figure 1A:
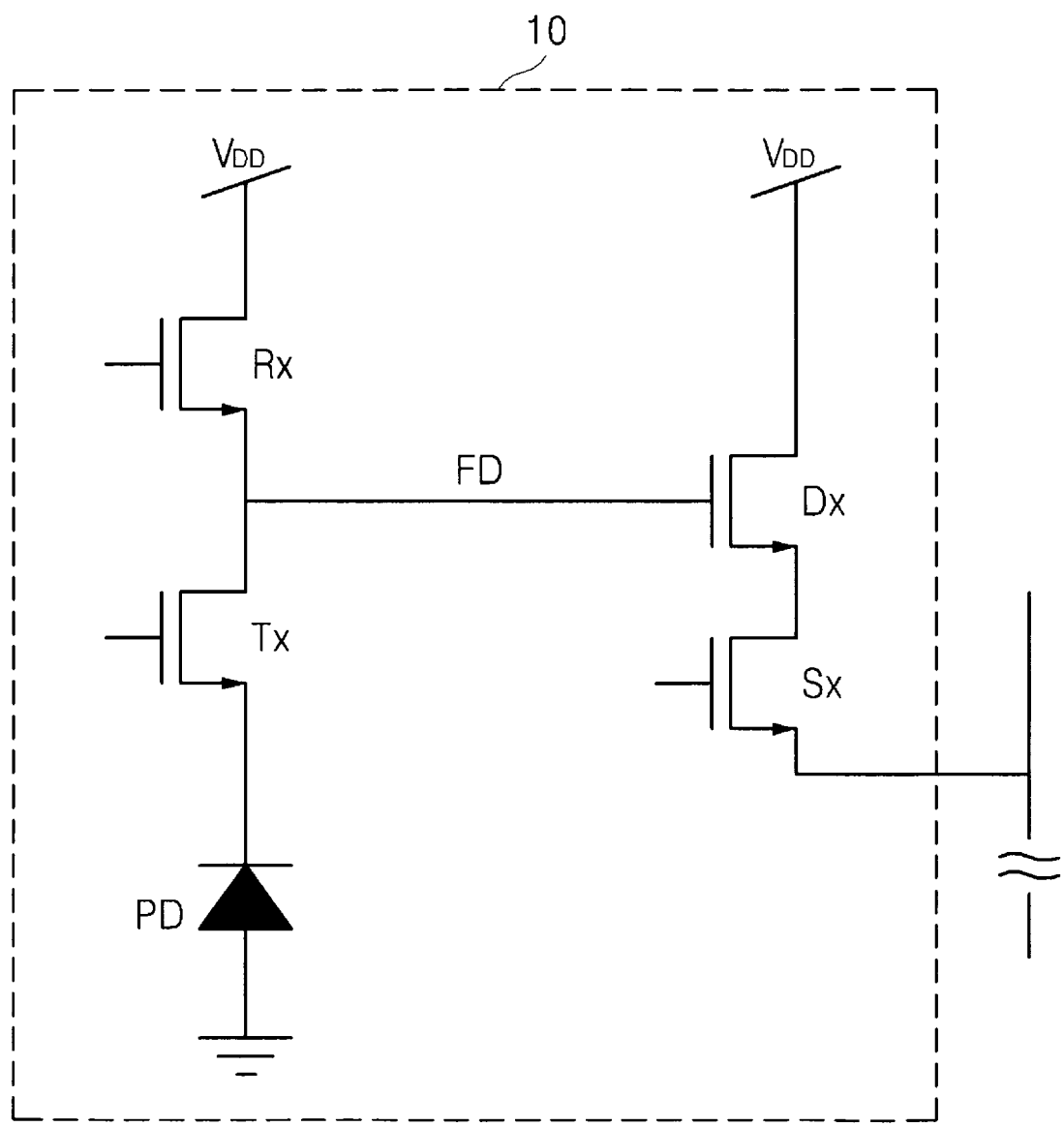
FIG. 1A is a circuit diagram of a conventional time-based CMOS image sensor.
Figure 1B:
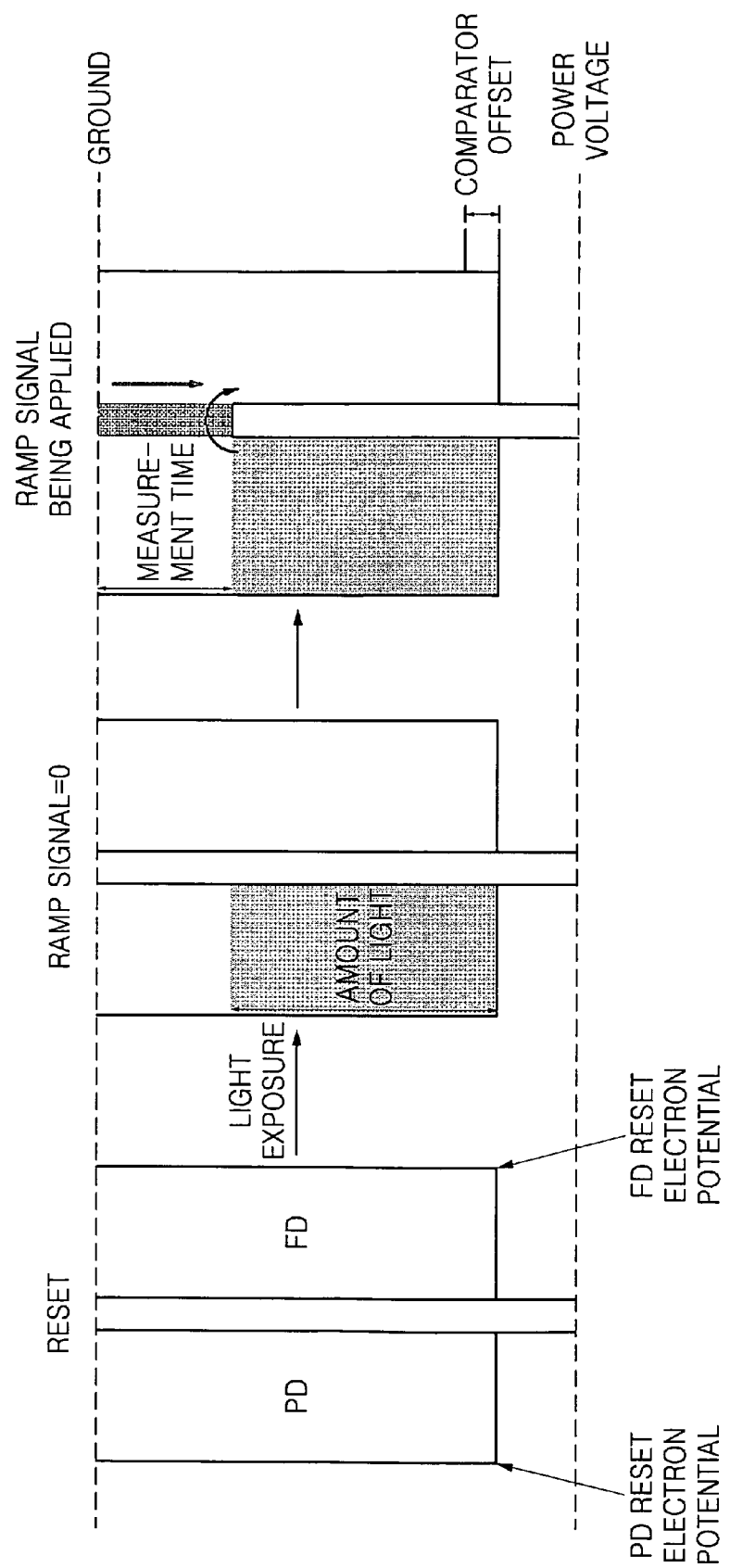
FIG. 1B is an electron potential diagram during resetting of the time-based CMOS image sensor of FIG. 1A.

Example embodiments will now be described more fully with reference to the accompanying drawings. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Now, in order to more specifically describe example embodiments, example embodiments will be described in detail with reference to the attached drawings. However, example embodiments are not limited to the embodiments described herein, but may be embodied in various forms.

FIG. 2 is a reset electron potential diagram according to example embodiments. Example embodiments of the reset electron potential diagram of FIG. 2, are described, for example, with respect to FIGS. 3-5.

For instance, in FIG. 3, which uses a mechanical method, a reset transistor having a threshold voltage lower than that of a transfer transistor may be used so that the reset electron potential of a photodiode may be higher than that of a floating diffusion node. However, in FIGS. 4 and 5, a driving method is used instead of the mechanical method, where the photodiode is reset by a voltage lower than the floating diffusion node during resetting so that the reset electron potential of the photodiode may be higher than that of the floating diffusion node. Example embodiments shown in FIGS. 3-5 will be described in more detail below.

In FIG. 2, the lower dotted line denotes an electron potential of the power voltage $V_{DD}$ and the upper dotted line denotes an electron potential of the ground. The power voltage $V_{DD}$ may be greater than the ground voltage. However, since the power voltage $V_{DD}$ is illustrated using a level of the electron potential, the power voltage $V_{DD}$ is illustrated as less than or below the ground in FIG. 2.

Also, in each of the diagrams (a), (b), and (c) of FIG. 2, the left portion indicates the reset electron potential of the photodiode, the central portion indicates the reset electron potential of a gate of the transfer transistor, and the right portion indicates the reset electron potential of the floating diffusion node. The diagram (a) shows the electron potential at the resetting by the reset transistor. The diagram (b) shows the electron potential in a section in which unit pixels are exposed to light so that photo-generated charges generated by the photodiode are accumulated and a ramp signal is not yet applied to the transfer transistor. The diagram (c) shows the electron potential in a section in which the ramp signal is applied to the transfer transistor so that the photo-generated charges accumulated in the photodiode are transferred to the floating diffusion node via the transfer transistor.

In the diagram (a), the reset electron potential of the floating diffusion node is separated by $V_T$ from the power voltage $V_{DD}$. For example, the reset voltage of the floating diffusion node is $V_{DD}-V_T$. The $V_T$ corresponds to the threshold voltage of the reset transistor. Meanwhile, the reset electron potential of the photodiode is separated by $(V_T+\Delta)$ from the power voltage $V_{DD}$. That is, the reset voltage of the photodiode is $V_{DD}-V_T-\Delta$. The $\Delta$ is a comparator offset. The comparator offset may be a decision threshold and may signify the minimum voltage that may be detected by a comparator or an inverter.

According to a conventional time-based CMOS image sensor, when a fine light signal, where an intensity of the light may be low, is input so that the amount of light is smaller than the comparator offset, as described above, even if a ramp signal is applied, the image sensor may not be operable. However, as shown in FIG. 2, as the reset electron potential of the photodiode is higher than the reset electron potential of the floating diffusion node raised by the comparator offset. Thus, even if a fine light signal is input, the light signal may be sufficiently detected because the difference in the reset electron potential from the photodiode PD to the floating diffusion node FD exceeds the comparator offset. Although the diagram (b) illustrates a case in which the amount of light is relatively large, even when a light signal having a smaller amount is input, the light signal may be sufficiently detected by the comparator because the (reset) electron potential of the photodiode is set to be higher than that of the floating diffusion node by at least the comparator offset.

Example embodiments for setting the reset electron potential of the photodiode to be higher than that of the floating diffusion node are described in further detail below.

FIG. 3 is a circuit diagram of a time-based CMOS image sensor 100 according to example embodiments. Referring to FIG. 3, a time-based CMOS image sensor according to example embodiments includes a photodiode PD, a transfer transistor Tx, a reset transistor Rx, a floating diffusion node FD, a drive transistor Dx, a pixel selection transistor Sx, and a comparator C. The photodiode PD, the transfer transistor Tx, the reset transistor Rx, the floating diffusion node FD, the drive transistor Dx, and the pixel selection transistor Sx constitute a unit pixel 100.

The photodiode PD may convert incident light according to a wavelength thereof to an electric signal to generate and accumulate photo-generated charges. The photo-diode PD may concentrate the incident light in a range of all wavelengths such that quantum efficiency may approach 1. The photodiode may be embodied in an n or $n_0$ doped region and a surface p type doped region. An anode may be grounded and a cathode may be electrically connected to a source of the transfer transistor Tx.

The transfer transistor Tx may transfer the photo-generated charges generated in the photodiode PD to the floating diffusion node FD. A ramp signal may be input to a gate of the transfer transistor Tx for the time-based operation. The threshold voltage of the transfer transistor Tx may be $V_T$, similar to the drive transistor Dx and the pixel selection transistor Sx. A source of the transfer transistor Tx may be electrically connected to a cathode of the photodiode PD. A drain of the transfer transistor Tx may be electrically connected to a source of the reset transistor Rx and the floating diffusion node FD. The transfer transistor Tx may function as a transfer channel to transfer the photo-generated charges generated in the photodiode PD to the floating diffusion node FD as a ramp signal is applied to the gate of the transfer transistor Tx. In addition, the transfer transistor Tx may perform, with the reset transistor Rx, a reset function to remove electrons in the area of the photodiode PD.

The reset transistor Rx may reset the photodiode PD and the floating diffusion node FD for signal detection and exhaust the photo-generated charges stored in the photodiode PD and the floating diffusion node FD. The source of the reset transistor Rx may be electrically connected to the drain of the transfer transistor Tx. The power voltage $V_{DD}$ may be applied to a drain of the reset transistor Rx. Also, a reset signal may be applied to a gate of the reset transistor Rx. For the reset electron potential of the photodiode PD to be higher than that of the floating diffusion node FD, the threshold voltage of the reset transistor Rx may be lower than that of the transfer transistor Tx.

In more detail, the reset transistor Rx may have a threshold voltage of $V_T-\Delta$ that is lower than the threshold voltage $V_T$ of the transfer transistor Tx by $\Delta$. The $\Delta$ may be equal to or greater than the comparator offset ($\Delta \geq$ comparator offset). For example, an NMOS transistor having a low threshold voltage may be used as the reset transistor Rx. An NMOS transistor having a normal threshold voltage may be used as the transfer transistor Tx, the drive transistor Dx, and the pixel selection transistor Sx.

Assuming that the threshold voltage of the reset transistor Rx is $V_{T,L}$ and the threshold voltage of the transfer transistor Tx is $V_{T,H}$, the floating diffusion node FD may be reset to $V_{DD}-V_{T,L}$ and the photodiode PD may be reset to $V_{DD}-V_{T,H}$. Since a difference in the reset voltage between the photodiode PD and the floating diffusion node FD may be $\Delta = V_{T,H}-V_{T,L}$, the reset electron potential of the photodiode PD may be higher, by $\Delta$, than that of the floating diffusion node FD.

The floating diffusion node FD may function as a charge sensing node by receiving the photo-generated charges generated and accumulated in the photodiode PD and detecting the amount of the photo-generated charges due to a voltage drop. An end of the floating diffusion node FD may be electrically connected to the source of the reset transistor Rx and the drain of the transfer transistor Tx while another end of the floating diffusion node FD may be electrically connected to a gate of the drive transistor Dx.

The drive transistor Dx may function as a source follower by the amount of charges stored in the floating diffusion node FD. The power voltage $V_{DD}$ may be applied to a drain of the drive transistor Dx. A source of the drive transistor Dx may be electrically connected to a drain of the pixel selection transistor Sx. The gate of the drive transistor Dx may be electrically connected to the other end of the floating diffusion node FD.

The pixel selection transistor Sx may perform addressing of a pixel through switching. The drain of the pixel selection transistor Sx may be electrically connected to the source of the drive transistor Dx. A source of the pixel selection transistor Sx may be electrically connected to comparator. A pixel selection signal (not shown) may be applied to a gate of the pixel selection transistor Sx.

The comparator C may receive a signal output from a unit pixel and read a time when the ramp signal is greater than a light signal by $V_T$. The output of the comparator C, which may initially be at a ground level, may be transferred to the $V_{DD}$ via a signal output from the unit pixel. The comparator C includes an inverter, a switch, and a capacitor. The comparator C may have the comparator offset that is the minimum voltage value that may be detected. The comparator C may normally perform a correlated double sampling (CDS) method only when a signal corresponding to the amount of light greater than the comparator offset is input.

Although not illustrated, a ramp signal generation circuit may include a ramp signal generator generating an analog ramp voltage and a buffer amplifier receiving the ramp voltage and increasing a driving capability of the ramp voltage to supply the received ramp voltage to all comparators. For example, the number of the comparators connected to an output node of the buffer amplifier may be about 640 for a VGA resolution and about 1280 for an SXGA resolution.

Figure 4:
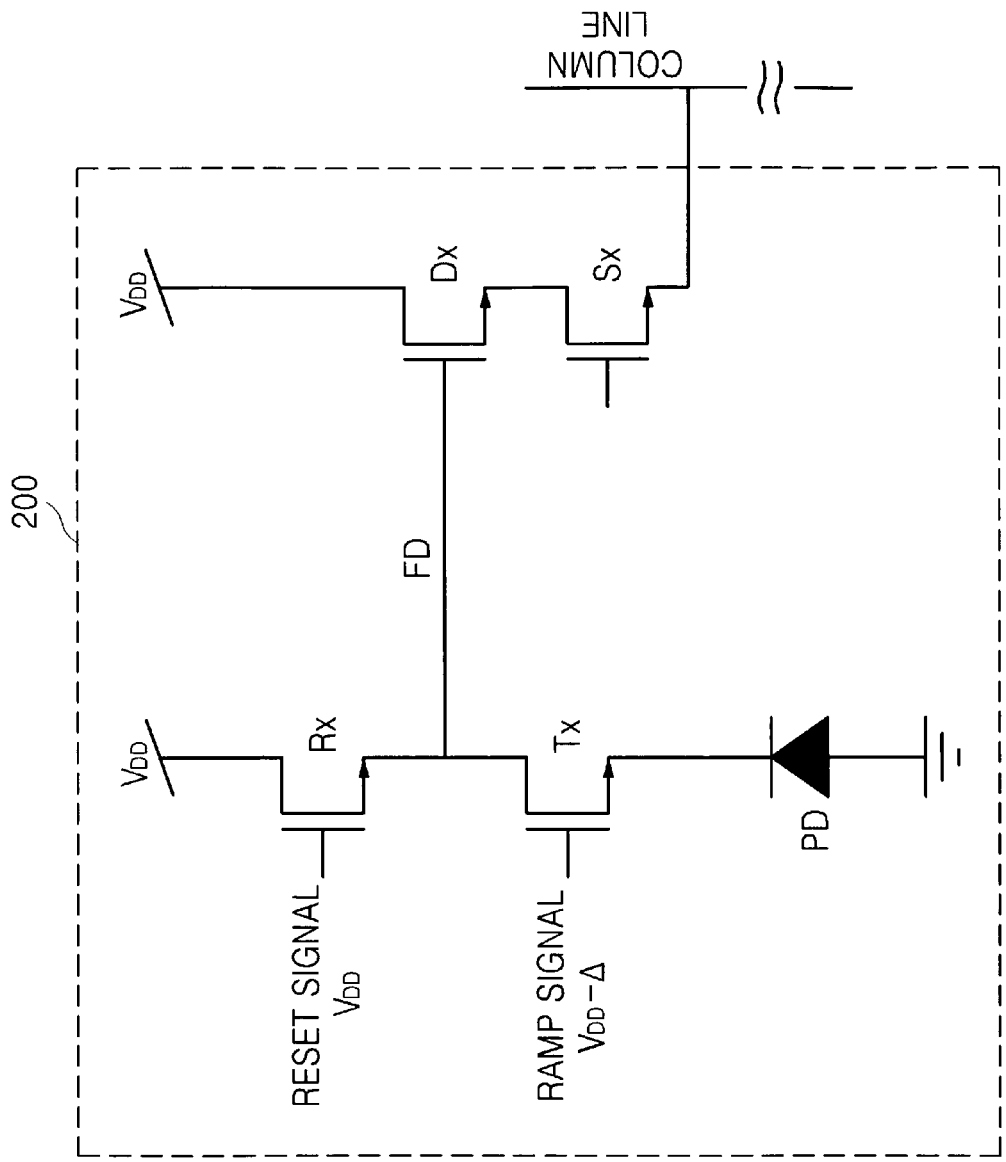
FIG. 4 is another circuit diagram of a time-based CMOS image sensor according to example embodiments.

FIG. 4 is another circuit diagram of a time-based CMOS image sensor 200 according to example embodiments. The time-based CMOS image sensor 200 shown in FIG. 4 according to example embodiments may be similar to the time-based CMOS image sensor 100 shown in FIG. 3, except that a voltage applied to the gate of the transfer transistor Tx may be controlled to be smaller than that applied to the gate of the reset transistor Rx during resetting and the threshold voltage of the reset transistor Tx may be set to be the same as that of the transfer transistor Tx. Therefore, a detailed operation of the similar features between the time-based CMOS image sensor 100 of FIG. 3 and the time-based CMOS image sensor 200 of FIG. 4 will be omitted. Also, the illustration of the comparator C in FIG. 3 is omitted in FIG. 4.

The time-based CMOS image sensor 200 according to example embodiments is formed of a unit pixel 200 as shown in FIG. 4 and may adopt the following reset method. A reset signal of the power voltage $V_{DD}$ may be applied to the gate of the reset transistor Rx. Assuming that the threshold voltage of the reset transistor Rx is $V_T$, the floating diffusion node FD may be reset to a voltage of $V_{DD}-V_T$.

A signal of $V_{DD}-\Delta$, that is smaller than the power voltage $V_{DD}$ applied to the gate of the reset transistor Rx, may be applied to the gate of the transfer transistor Tx. The threshold voltage of the transfer transistor Tx and the threshold voltage of the reset transistor Rx may be the same, such as $V_T$. Thus, the photodiode PD may be reset to a voltage of $V_{DD}-\Delta-V_T$.

The difference in the reset voltage between the photodiode PD and the floating diffusion node FD may be $\Delta$. As a result, the reset electron potential of the photodiode PD may be higher, by $\Delta$, than the reset electron potential of the floating diffusion node FD. For example, according to example embodiments, while a reset signal of $V_{DD}$ may be applied to the gate of the reset transistor Rx, a signal of $V_{DD}-\Delta$ may be applied to the gate of the transfer transistor Tx. Accordingly, the reset electron potential of the photodiode PD may be controlled to be higher than that of the floating diffusion node FD.

Figure 5:
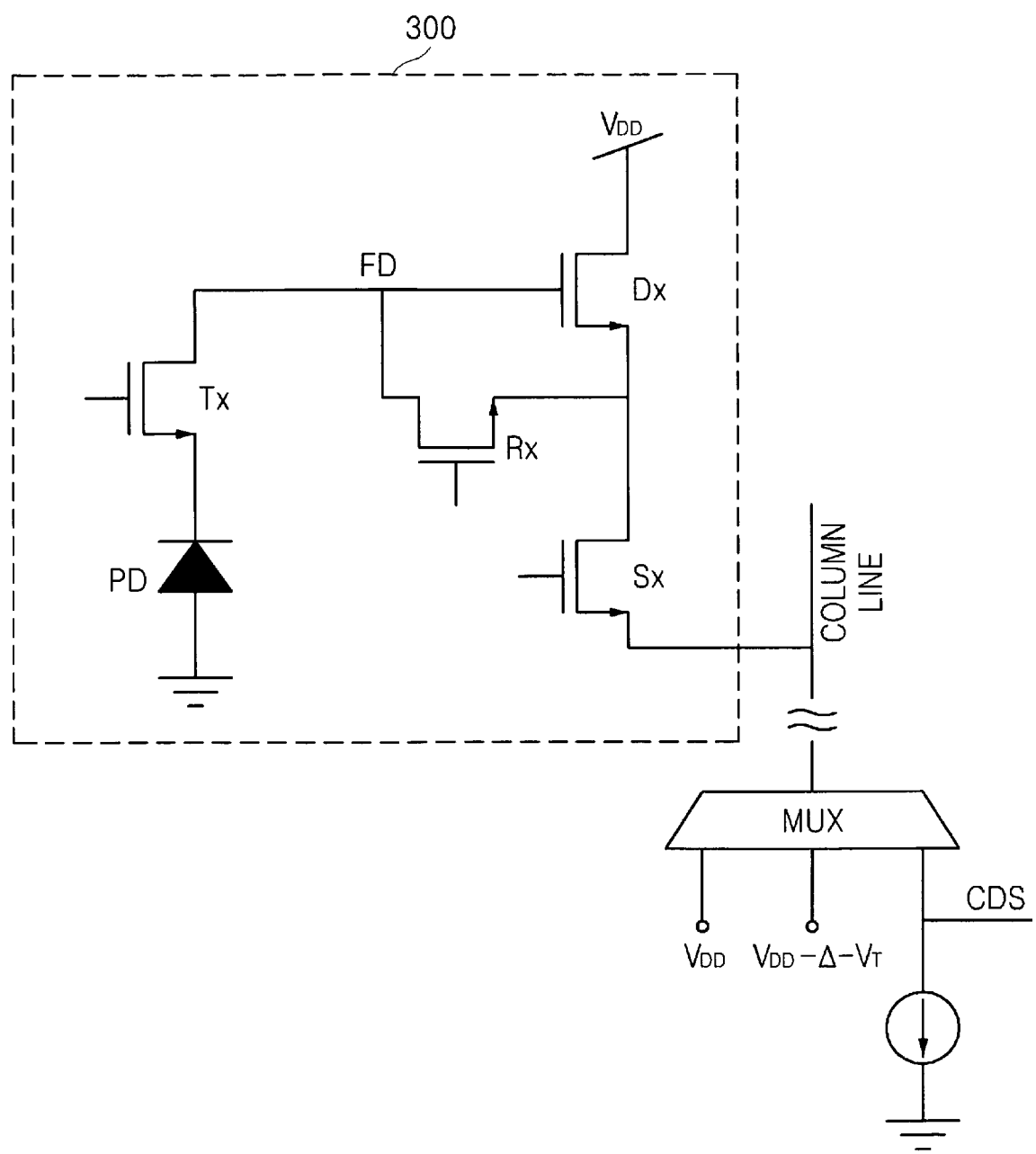
FIG. 5 is still another circuit diagram of a time-based CMOS image sensor according to example embodiments.

FIG. 5 is still another circuit diagram of a time-based CMOS image sensor 300 according to example embodiments. The time-based CMOS image sensor 300 shown in FIG. 5 according to example embodiments may be similar to the time-based CMOS image sensor 100 shown in FIG. 3, except that a voltage of $V_{DD}-\Delta-V_T$ may be applied to reset the photodiode PD, then the transfer transistor Tx may be turned off, and a voltage of $V_{DD}$ may be applied to reset the floating diffusion node FD. Therefore, a detailed operation of the similar features between the time-based CMOS image sensor 100 of FIG. 3 and the time-based CMOS image sensor 300 of FIG. 5 will be omitted.

In the time-based CMOS image sensor 300 according to example embodiments, referring to FIG. 5, a reset voltage may be applied via a column line. Also, in a unit pixel 300, the drain of the reset transistor Rx may be electrically connected to the floating diffusion node FD and the source of the reset transistor Rx may be electrically connected to the source of the drive transistor Dx and the drain of the pixel selection transistor Sx. Also, the time-based CMOS image sensor according to example embodiments may include a multiplexer MUX to sequentially apply the two reset voltages having a difference therebetween to the column line, such as one of the voltages $V_{DD}$ and $V_{DD}-\Delta-V_T$.

The time-based CMOS image sensor 100-300 according to example embodiments may adopt the following reset method. First, the transfer transistor Tx, the reset transistor Rx, and the pixel selection transistor Sx may be turned on and the voltage of $V_{DD}-\Delta-V_T$ may be applied to the column line via the multiplexer MUX so that the reset voltage of the photodiode PD is $V_{DD}-\Delta-V_T$.

Next, the transfer transistor Tx may be turned off so that the voltage applied to the column line may not affect the photodiode PD. Then, the voltage $V_{DD}$ may be applied to the column line via the multiplexer MUX so that the reset voltage of the floating diffusion node FD is $V_{DD}-V_T$. Thus, the difference in the reset voltage between the photodiode PD and the floating diffusion node FD may be $\Delta$. As a result, the reset electron potential of the photodiode PD may be higher, by $\Delta$, than that of the floating diffusion node FD.

Next, the overall driving method including the reset method of the time-based CMOS image sensor 100-300 according to example embodiments will be described below.

Figure 6:
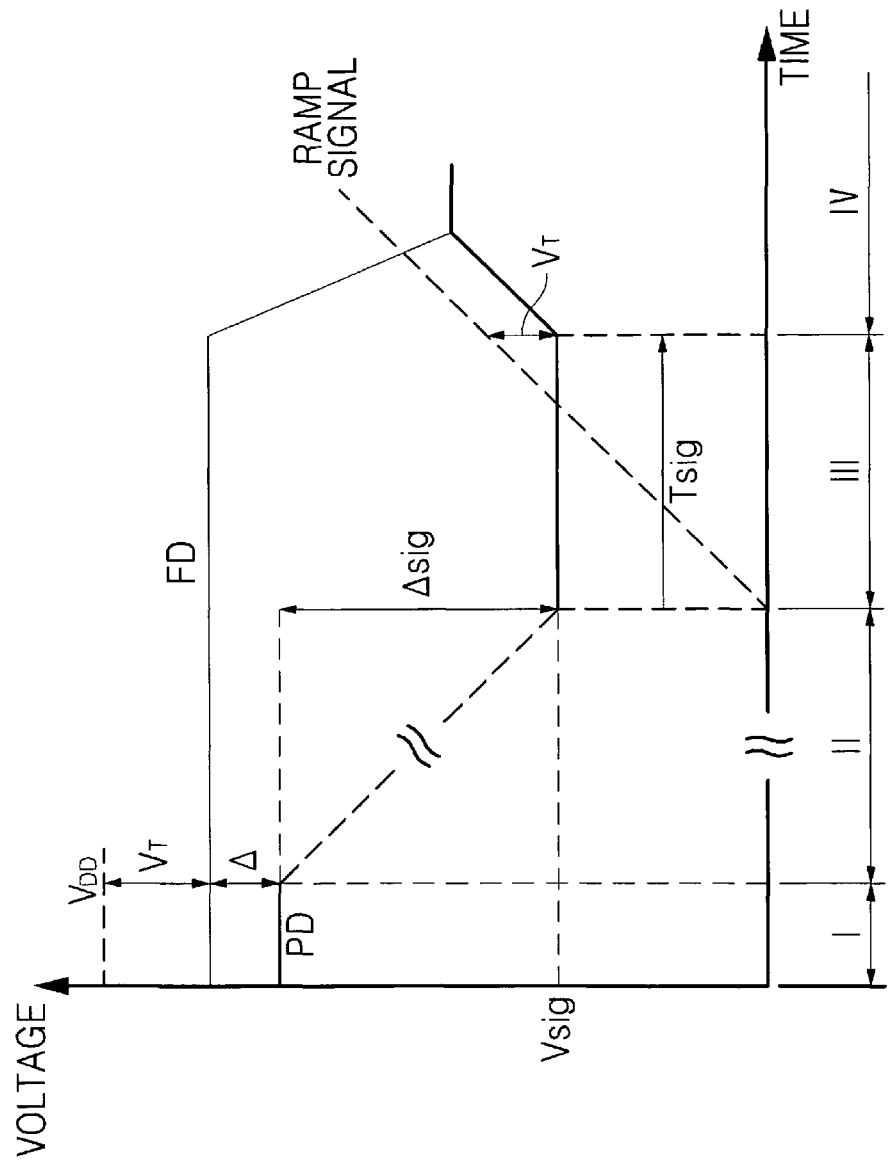
FIG. 6 is a graph showing each node voltage of the time-based CMOS image sensor according to example embodiments.

FIG. 6 is a graph showing each node voltage of the time-based CMOS image sensor according to example embodiments. Referring to FIG. 6, the horizontal axis and the vertical axis, respectively, denote time and voltage. In the following description, the method of driving a time-based CMOS image sensor 100-300 is described for each of I-IV sections.

In section I, the photodiode PD and the floating diffusion node FD may be reset. First, the transfer transistor Tx, the reset transistor Rx, and the pixel selection transistor Sx may be turned on to reset the photodiode PD and the floating diffusion node FD. The floating diffusion node FD may be reset to $V_{DD}-V_T$ and the photodiode PD may be reset to $V_{DD}-V_T-\Delta$ so that the reset voltage difference therebetween is $\Delta$. As a result, the reset electron potential of the photodiode PD may be higher, by $\Delta$, than that of the floating diffusion node FD.

In section II, the photo-generated charges generated by the photodiode PD may be concentrated in the photodiode PD. Although a concentration time of photo charges may be relatively long, for the convenience of explanation, the concentration time is illustrated as a relatively short section in FIG. 6.

As the photo-generated charges are accumulated, the voltage of the photodiode PD may decrease to $V_{sig}$, representing a change of $\Delta_{sig}$, which may be the amount of light or the photo-generated charges. To detect a signal due to the photo-generated charges accumulated in the photodiode PD, the reset transistor Rx may be turned on to reset the floating diffusion node FD. After the unit pixel is exposed to light, the pixel selection transistor Sx and the switch of the comparator C may be turned on to sample the reset voltage of the floating diffusion node FD and the offset of the capacitor of the comparator C. When the switch of the comparator C is turned off, a voltage $V_{CDS}$ stored in the capacitor of the comparator C may be expressed by Equation 1, as follows:

$$V_{CDS} = V_{DD} - V_{T,R} - V_{T,D} - V_{DSAT,D} - V_{OFF} \quad \text{(Equation 1)}.$$

In Equation 1, $V_{OFF}$ is an offset voltage of the comparator C, $V_{T,R}$ is a threshold voltage of the reset transistor Rx, $V_{T,D}$ is a threshold voltage of the drive transistor Dx, and $V_{DSAT,D}$ is a source-drain saturation voltage of the drive transistor Dx.

In section III, a ramp signal may be applied to transfer the photo-generated charges concentrated in the section II to the floating diffusion node FD. In section IV, the photo-generated charges concentrated in the photodiode PD may be transferred to the floating diffusion node FD.

The voltage of the photodiode PD may maintain a constant value until the transfer transistor Tx is turned on, for example, the ramp signal becomes $V_{sig}+V_T$. When the ramp signal is applied to the gate of the transfer transistor Tx and thus a gate-source voltage $V_{GS}$ of the transfer transistor Tx exceeds the threshold voltage $V_T$, the transfer transistor Tx may be turned on. Accordingly, the photo-generated charges concentrated in the photodiode PD may be transferred to the floating diffusion node FD so that the photodiode PD and the floating diffusion node FD may share the photo-generated charges. The charge sharing may drop the voltage of the floating diffusion node FD and increase the voltage of the photodiode PD so that both voltages may be the same. Thus, the comparator C may be latched to $V_{DD}$ at the ground.

Assuming that the amount of light is $\Delta_{sig}$, the electron potential difference between the floating diffusion node FD and the photodiode PD is $\Delta$, a light signal amount measurement time is $T_{sig}$, the inclination (or slope) of a ramp signal is $S_{ramp}$, and the threshold voltage of the transfer transistor Tx is $V_T$, the following may be accomplished:

$$S_{ramp} \times T_{sig} - V_T = V_{DD} - V_T - \Delta - \Delta_{sig} \quad \text{(Equation 2)}.$$

Equation 2 may be summarized as follows:

$$T_{sig} = (V_{DD} - \Delta - \Delta_{sig})/S_{ramp} \quad \text{(Equation 3)}.$$

Referring to Equation 3, $T_{sig}$ may include not only the amount of light $\Delta_{sig}$, but also the comparator offset $\Delta$. To remove the comparator offset, the digital CDS method may be applied.

Since the operation at a low illumination is possible, assuming that the light signal amount measurement time is $T_{rst}$ when the amount of light $\Delta_{sig}$ is 0, $T_{rst}$ may be obtained as follows:

$$T_{rst} = (V_{DD} - \Delta)/S_{ramp} \quad \text{(Equation 4)}.$$

The amount of light $\Delta_{sig}$ is given by Equations 3 and 4 as follows:

$$\Delta_{sig} = S_{ramp}(T_{rst} - T_{sig}) \quad \text{(Equation 5)}.$$

Referring to FIG. 5, when the inclination $S_{ramp}$ of a ramp signal is found, a precise amount of a signal $\Delta_{sig}$ may be obtained where a variation between the comparator offset $\Delta$ and the threshold voltage of the transfer transistor Tx is removed using the digital CDS method.

As a result, the time-based CMOS image sensor according to example embodiments may be operated at a low illumination by detecting the amount of light even when a fine light signal is input. Also, according to example embodiments, an accurate amount of a light signal where a variation of the comparator offset and the threshold voltage of the transfer transistor is removed by using the digital CDS method, may be detected.

According to example embodiments, by improving the method of resetting a time-based CMOS image sensor for a low voltage which may have not been used for a low illumination photography, the image sensor may be precisely operated with respect to a fine signal and may be widely used not only for low voltage image sensors such as digital cameras or mobile phone camera modules, but also for commercial image sensors such as video conference cameras, PC cameras, or next generation personal portable communication apparatuses having a function to transfer image information.

While example embodiments have been particularly shown and described with reference to preferred embodiments thereof, it will be understood by those skilled in the art that various changes in form and details may be made therein without departing from the spirit and scope of example embodiments as defined by the appended claims. The preferred embodiments should be considered in descriptive sense only and not for purposes of limitation. Therefore, the scope of example embodiments is defined not by the detailed description of example embodiments but by the appended claims, and all differences within the scope will be construed as being included in example embodiments.

What is claimed is:

1. A method of resetting a time-based CMOS image sensor, the time-based CMOS image sensor including a photodiode, a transfer transistor transferring photo-generated charges generated in the photodiode to a floating diffusion node and having a gate to which a ramp signal is input, and a reset transistor resetting the photodiode and the floating diffusion node, the method comprising:
   generating photo-generated charges at the photodiode;
   transferring the photo-generated charges to the floating diffusion node in response to a ramp signal; and
   resetting a reset electron potential of the photodiode to be higher than a reset electron potential of the floating diffusion node.

2. The method of claim 1, wherein the resetting includes applying a voltage to the transfer transistor that is smaller than a voltage applied to the reset transistor.

3. The method of claim 1, wherein the resetting includes, resetting the electron potential of the photodiode to $V_{DD}-\Delta-V_T$, where the $V_{DD}$ is a power voltage and the $V_T$ is a threshold voltage of the transfer transistor or the reset transistor and $\Delta>0$,
   turning the transfer transistor off after the voltage of the photodiode is reset to $V_{DD}-\Delta-V_T$, and
   resetting a voltage of the floating diffusion node to $V_{DD}-V_T$.

4. The method of claim 3, further comprising:
   turning on a pixel selection transistor and a switch of a comparator to sample the voltage of the floating diffusion node and an offset voltage of the comparator, where a gate of a drive transistor is connected to the floating diffusion node, a drain of the pixel selection transistor is connected to a source of the drive transistor, and the comparator is connected to a source of the pixel selection transistor.

5. The method of claim 4, wherein a threshold voltage difference between the reset transistor and the transfer transistor is greater than or equal to the comparator offset voltage, where the comparator offset voltage is a minimum voltage that is detected by the comparator.

6. The method of claim 1, further comprising:
turning off the reset transistor and the transfer transistor after the resetting to concentrate the photo-generated charges in the photodiode; and
applying a ramp signal to a gate of the transfer transistor to transfer the photo-generated charges concentrated in the photodiode to the floating diffusion node.

7. The method of claim 6, further comprising:
measuring a section of time of in which a voltage of the photodiode is maintained constant during which the ramp signal is applied in the applying of the ramp signal to the gate of the transfer transistor.

8. The method of claim 7, wherein the measuring the section of time includes determining a measurement time, $T_{sig}$, by the equation, $$T_{sig}=(V_{DD}-\Delta-\Delta_{sig})/S_{ramp},$$

where $V_{DD}$ is a power voltage, $\Delta$ is at least one of a comparator offset voltage and electron potential difference between the floating diffusion node FD and the photodiode, $\Delta_{sig}$ is an amount of the photo-generated charges, and $S_{ramp}$ is an inclination of the ramp signal.

9. The method of claim 8, further comprising:
applying digital correlated double sampling (CDS) to remove at least one of a threshold voltage of the transfer resistor and the comparator offset voltage.

10. The method of claim 2, further comprising:
turning off the reset transistor and the transfer transistor after the resetting to concentrate the photo-generated charges in the photodiode; and
applying a ramp signal to a gate of the transfer transistor to transfer the photo-generated charges concentrated in the photodiode to the floating diffusion node.

11. The method of claim 10, further comprising:
measuring a section of time of in which a voltage of the photodiode is maintained constant during which the ramp signal is applied in the applying of the ramp signal to the gate of the transfer transistor.

12. The method of claim 11, wherein the measuring the section of time includes determining a measurement time, $T_{sig}$ by the equation, $$T_{sig}=(V_{DD}-\Delta-\Delta_{sig})/S_{ramp},$$

where $V_{DD}$ is a power voltage, $\Delta$ is at least one of a comparator offset voltage and electron potential difference between the floating diffusion node FD and the photodiode, $\Delta sig$ is an amount of the photo-generated charges, and $S_{ramp}$ is an inclination of the ramp signal.

13. The method of claim 12, further comprising:
applying digital correlated double sampling (CDS) to remove at least one of a threshold voltage of the transfer resistor and the comparator offset voltage.

14. The method of claim 3, further comprising:
turning off the reset transistor and the transfer transistor after the resetting to concentrate the photo-generated charges in the photodiode; and
applying a ramp signal to a gate of the transfer transistor to transfer the photo-generated charges concentrated in the photodiode to the floating diffusion node.

15. The method of claim 14, further comprising:
measuring a section of time of in which a voltage of the photodiode is maintained constant during which the ramp signal is applied in the applying of the ramp signal to the gate of the transfer transistor.

16. The method of claim 15, wherein the measuring the section of time includes determining a measurement time, $T_{sig}$, by the equation, $$T_{sig}=(V_{DD}-\Delta-\Delta_{sig})/S_{ramp},$$

where $V_{DD}$ is a power voltage, $\Delta$ is at least one of a comparator offset voltage and electron potential difference between the floating diffusion node FD and the photodiode, $\Delta_{sig}$ is an amount of the photo-generated charges, and $S_{ramp}$ is an inclination of the ramp signal.

17. The method of claim 16, further comprising:
applying digital correlated double sampling (CDS) to remove at least one of a threshold voltage of the transfer resistor and the comparator offset voltage.

* * * * *